United States Patent
Hirai

(10) Patent No.: US 7,092,626 B2
(45) Date of Patent: Aug. 15, 2006

(54) PLACEMENT OF LIGHT-EMITTING SECTION IN IMAGE SENSING APPARATUS

(75) Inventor: Yoshiyuki Hirai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 112 days.

(21) Appl. No.: 10/891,634

(22) Filed: Jul. 15, 2004

(65) Prior Publication Data

US 2005/0025473 A1 Feb. 3, 2005

(30) Foreign Application Priority Data

Jul. 28, 2003 (JP) ............... 2003-280790

(51) Int. Cl.
G03B 13/02 (2006.01)
G03B 15/03 (2006.01)
H04N 5/225 (2006.01)
H04N 7/14 (2006.01)
H04M 1/00 (2006.01)

(52) U.S. Cl. ............... 396/176; 396/374; 396/429; 348/333.06; 348/370; 348/376; 348/14.02; 455/575.3

(58) Field of Classification Search ............... 396/176, 396/287, 291, 374, 429, 535; 348/370, 371, 348/373–376, 333.06, 333.07
See application file for complete search history.

(56) References Cited

U.S. PATENT DOCUMENTS

| 5,691,766 | A | 11/1997 | Murata et al. | ............... 348/370 |
| 6,445,417 | B1 * | 9/2002 | Yoshida et al. | ............. 348/374 |
| 6,697,117 | B1 * | 2/2004 | Park | ............................ 348/373 |
| 6,865,406 | B1 * | 3/2005 | Park | ........................ 455/575.3 |
| 6,925,254 | B1 * | 8/2005 | Kato et al. | ................... 396/177 |
| 2003/0107669 | A1 * | 6/2003 | Ito et al. | ..................... 348/370 |

FOREIGN PATENT DOCUMENTS

| EP | 0 689 350 A2 | 12/1995 |
| JP | 11-331669 | 11/1999 |
| JP | 2000-270069 | 9/2000 |
| JP | 2001-169161 | 6/2001 |
| JP | 2001-268419 | 9/2001 |
| JP | 2002-250962 | 9/2002 |
| JP | 2002-314865 | 10/2002 |
| JP | 2003-131755 | 5/2003 |

OTHER PUBLICATIONS

European Search Report dated Nov. 16, 2004.
Japanese Patent Office JP 11-331669, date of publication of application Nov. 30, 1999.

* cited by examiner

Primary Examiner—W. B. Perkey
(74) Attorney, Agent, or Firm—Morgan & Finnegan, LLP

(57) ABSTRACT

In an image sensing device in which a hinge mechanism is secured to the side face of the main body of the image sensing device and an image display unit for displaying a captured image is mounted by the hinge mechanism so as to be free to rotate, a light-emitting device for emitting light toward a subject is accommodated inside the hinge mechanism.

10 Claims, 15 Drawing Sheets

FIG. 5A
FIG. 5B
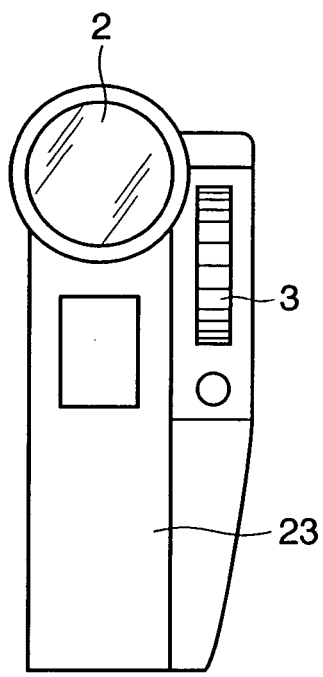
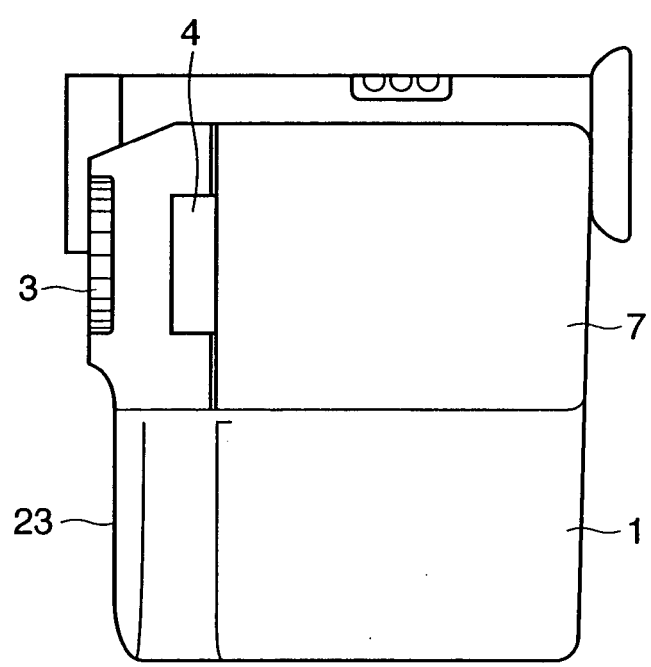

FIG. 7A
FIG. 7B
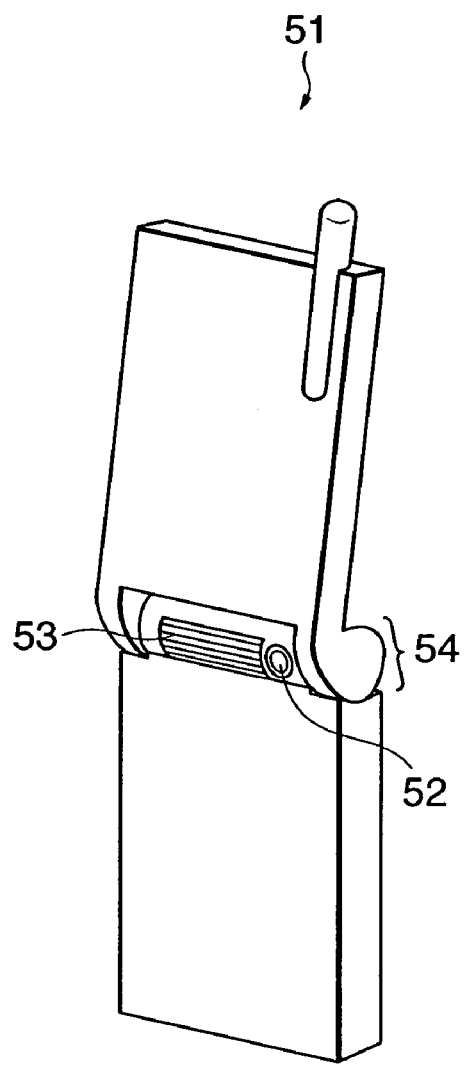
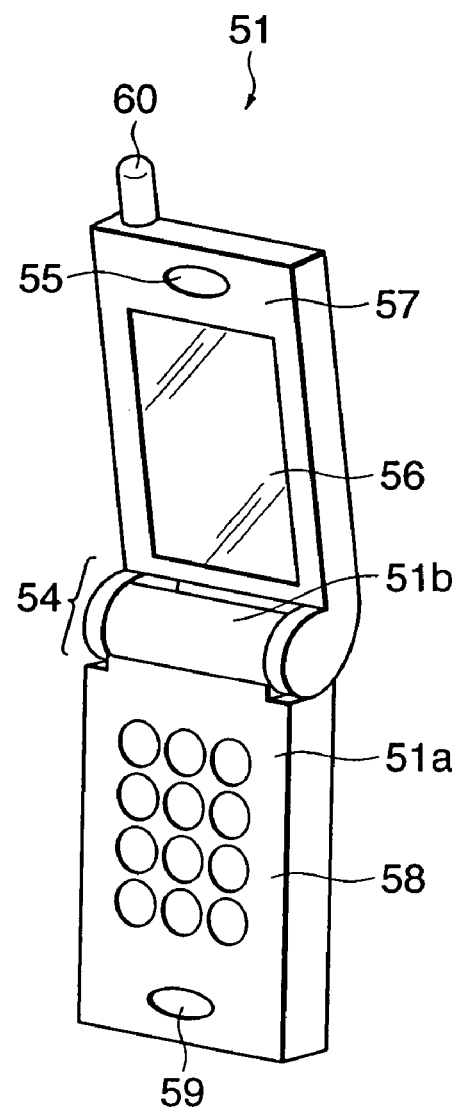

PRIOR ART

PRIOR ART

PRIOR ART

PRIOR ART

PRIOR ART

PLACEMENT OF LIGHT-EMITTING SECTION IN IMAGE SENSING APPARATUS

CLAIM OF PRIORITY

This application claims priority from Japanese Patent Application No. 2003-280790 and filed on Jul. 28, 2003, the entire contents of which are incorporated herein by reference.

FIELD OF THE INVENTION

This invention relates to a structure for placement of a light-emitting section used in an image sensing apparatus to illuminate a subject.

BACKGROUND OF THE INVENTION

An example of a conventional image sensing apparatus equipped with a light-emitting section for illuminating a subject will be described with reference to FIGS. 11 to 15.

FIGS. 11 to 13 illustrate examples of an image sensing apparatus in which the light-emitting section is always exposed externally for design reasons. FIGS. 14 and 15 illustrate structures in which the light-emitting section usually is concealed within the main body of the image sensing apparatus and is exposed externally of the apparatus by automatic or manual operation when necessary.

In FIGS. 11, 12, 13, 14 and 15, reference numerals 101, 111, 121, 131 and 141 each denote the main body of an image sensing apparatus, reference numerals 102, 112, 122, 132 and 142 each denote an imaging lens, and reference numerals 103, 113, 123, 133 and 143 each denote a light-emitting section.

The light-emitting section 103 in FIG. 11 is placed above the imaging lens 102 (for example, see the specification of Japanese Patent Application Laid-Open No. 2002-314865).

The light-emitting section 113 in FIG. 12 is placed below a hinge mechanism 114 so adapted that an image display device 117 may be opened and closed freely relative to the main body 111 of the image sensing apparatus. Further, the light-emitting section 123 of FIG. 13 is placed below the imaging lens 122. When the user of the image sensing apparatus shown in FIG. 12 or 13 grasps the main body 111 or 121 of the image sensing apparatus, the right hand 116 or 126 of the user comes into intimate contact with the front end face 115 or 125 of the main body 111 or 121 as illustrated in FIG. 12 or 13.

Furthermore, the light-emitting section 133 in FIG. 14 is held by a member 136 so adapted that the light-emitting section 133 may be rotated freely in the directions of arrows 137 about a point 134. The holding member 136 is so designed that the light-emitting section 133 is situated at position b when it is concealed within the main body 131 of the image sensing apparatus and at position a when it is exposed. A similar arrangement is described in the specification of Japanese Patent Application Laid-Open No. 2002-250962.

Furthermore, in FIG. 15, the light-emitting section 143 is held by a member 146 so adapted that the light-emitting section 143 may be rotated freely in the directions of arrows 147 about a point 144 in a manner similar to that of FIG. 14. The holding member 146 is so designed that the light-emitting section 143 is situated at position b when it is concealed within the main body 141 of the image sensing apparatus and at position a when it is exposed. Part of the imaging lens 142 is provided with a recess 145 in order to accommodate the holding member 146 at position b.

The light-emitting section in the description above mainly is used when taking a still picture if it is referred to as an electronic flash and is used when shooting a moving picture if it is referred to as a video light.

The following problems arise with the placement of the light-emitting section described above:

(1) If the light-emitting section is disposed as shown in FIG. 11, the height H of the main body of the image sensing apparatus increases and the apparatus becomes large in size.

(2) If the light-emitting section is disposed as shown in FIGS. 12 and 13, there is the danger that the light-emitting section will be concealed by the fingers of the user when the user grasps the main body of the image sensing apparatus by hand. Operability is poor.

(3) If a configuration in which the light-emitting section is made to project is adopted, this will detract from the attractive external appearance of the design.

(4) If the light-emitting section is disposed as shown in FIGS. 14 and 15, a rotation mechanism that causes the light-emitting section to pop up is required, the cost of the image sensing apparatus rises and the apparatus becomes large in size.

SUMMARY OF THE INVENTION

The present invention has been made in view of the above circumstances and its object is to improve operability when the light-emitting section is used for shooting a picture, while preventing an increase in the size of the image sensing apparatus as well as a rise in the cost thereof.

According to the present invention, the foregoing object is attained by providing an image sensing apparatus comprising: a main body (1, 58, 78, 88) of an image sensing apparatus enclosed by a first case member (1a, 51a 71a); an image sensing unit having an imaging lens (2, 52, 72, 82, 301) and a solid-state image sensing device (302, 67) for converting light from a subject, which enters via the imaging lens, to an electric signal; a light-emitting device (3, 5, 53, 73, 83, 309) for emitting light toward the subject; an image display unit having an image display screen (6, 56, 76, 86) for displaying an image captured by the image sensing unit, and a second case member (7, 57, 77, 87) provided so as to enclose an outer frame of the image display screen; a rotating member (13a, 13b, 21, 22, 26, 63a, 63b, 64, 65a, 65b) for holding the main body of the image sensing apparatus and the image display unit rotatably relative to each other; and a third case member (1b, 51b, 71b) for internally accommodating the rotating member and the light-emitting device, the third case member being secured to the first case member and provided projectively with respect to the first case member, or being secured to the second case member and provided projectively with respect to the second case member.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5A is a front view illustrating the main body of an image sensing apparatus according to the first embodiment;

FIG. 5B is a side view illustrating the main body of the image sensing apparatus according to the first embodiment;

FIG. 7A is a back perspective view illustrating an image sensing apparatus according to a second embodiment of the present invention;

FIG. 7B is a front perspective view illustrating the image sensing apparatus according to the second embodiment of the present invention;

DETAILED DESCRIPTION OF THE PREFERRED EMBODIMENTS

Preferred embodiments of the present invention will be described in detail in accordance with the accompanying drawings.

<First Embodiment>

A first embodiment of the present invention will be described with reference to FIGS. 1 to 6.

Figure 1:
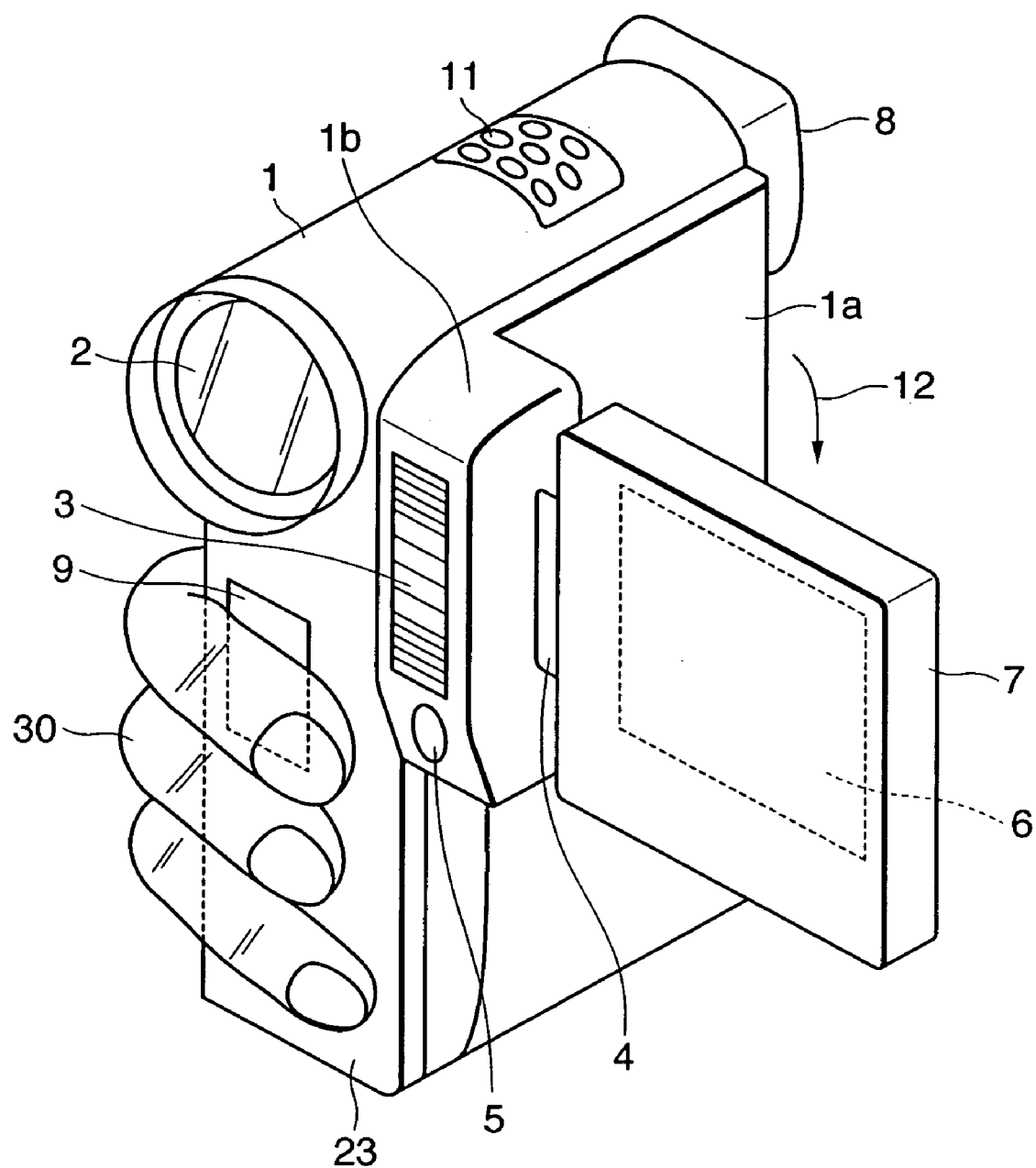
FIG. 1 is a perspective view of an image sensing apparatus according to a first embodiment of the present invention.

Shown in FIG. 1 are the main body 1 of an image sensing apparatus, an imaging lens 2, a light-emitting section 3, an image display device (which generally employs an LCD panel) 6 and a case 7 that holds the image display device 6. The case 7 is attached to the main body 1 of the image sensing apparatus by a hinge portion 4 so as to be free to open and close. The light-emitting section 3 and the hinge portion 4 are incorporated within a case member 1b which is fixed on a case member 1a that is one surface of the main body 1, and extrudes from the case member 1a.

When the user grasps the image sensing apparatus, the user usually grips the main body using his/her right hand 30. The display-device case 7 that is opened and closed is disposed on the upper part of the main body 1 on the side opposite that grasped by the right hand 30. FIG. 1 is a diagram illustrating the case 7 opened in the direction of arrow 12 with respect to the main body 1 of the image sensing apparatus. Reference numeral 5 denotes a white LED constituting a second light-emitting section. The LED 5 assists in illuminating a dimly lit subject by emitting light toward the subject. The LED 5 is used as auxiliary light when automatic focus and range adjustments are made and as a video light when a moving picture is shot. Reference numeral 8 denotes a second image display unit and 11 a microphone.

Figure 2:
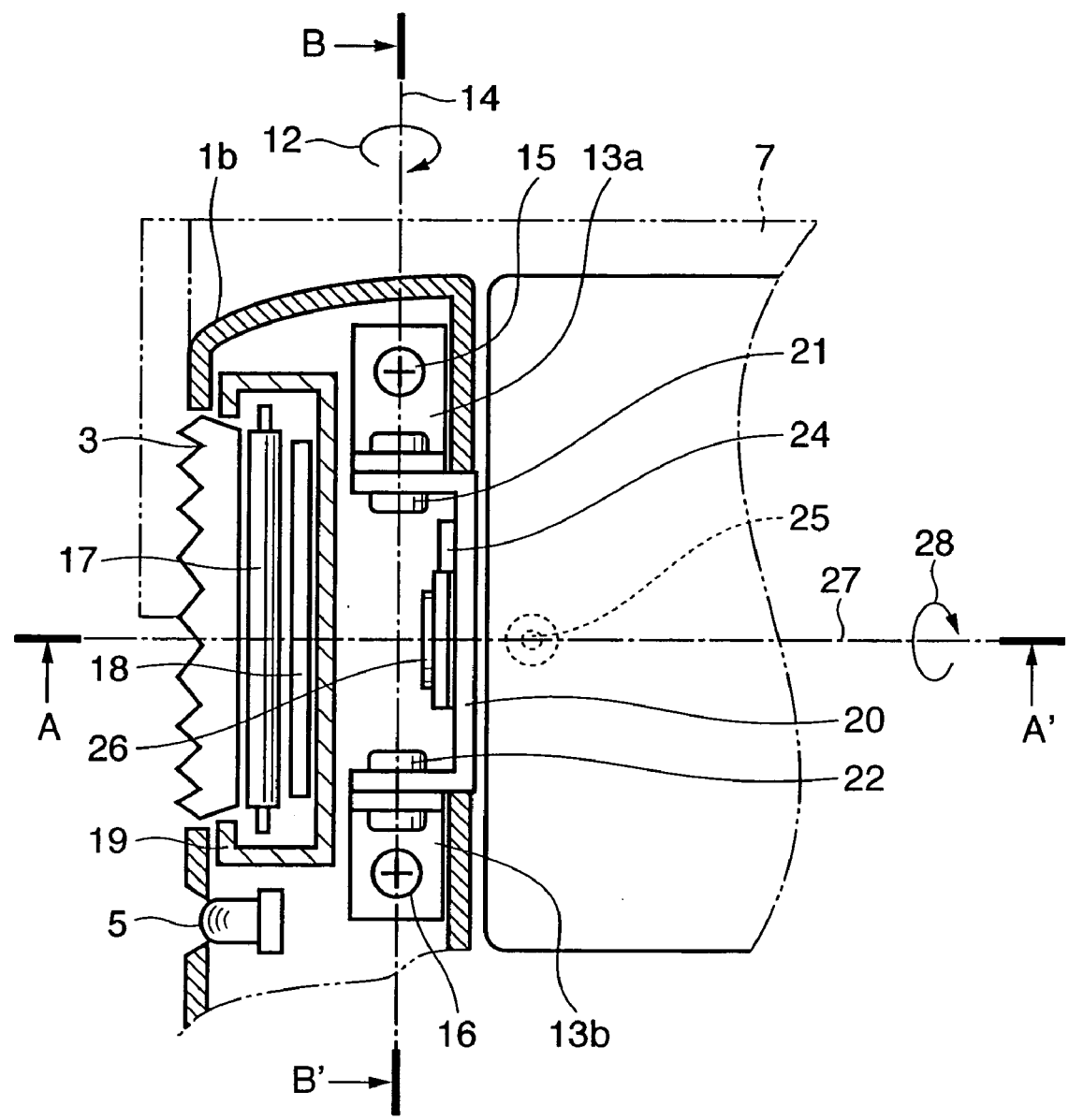
FIG. 2 is a sectional view of a light-emitting section according to the first embodiment of the present invention.

The structure of the hinge portion 4, which includes the light-emitting section 3, will be described with reference to FIGS. 2, 3 and 4. The light-emitting section 3, which includes a xenon lamp 17 serving as a light-emitting member and a reflector 18 for reflecting the light from the xenon lamp 17, constitutes a light-guide member for transmitting the light from the reflector 18 to illuminate the subject. These structural components are held on the main body 1 of the image sensing apparatus by a holding member 19. Further, as shown in FIG. 2, bases 13a, 13b of the hinge mechanism are secured to the main body 1 by fastening parts 15, 16. A rotating member 20 adapted to be freely rotatable with respect to the bases 13a, 13b via rotary shaft members 21, 22 is secured to the case 7 of the image display device.

Figure 3:
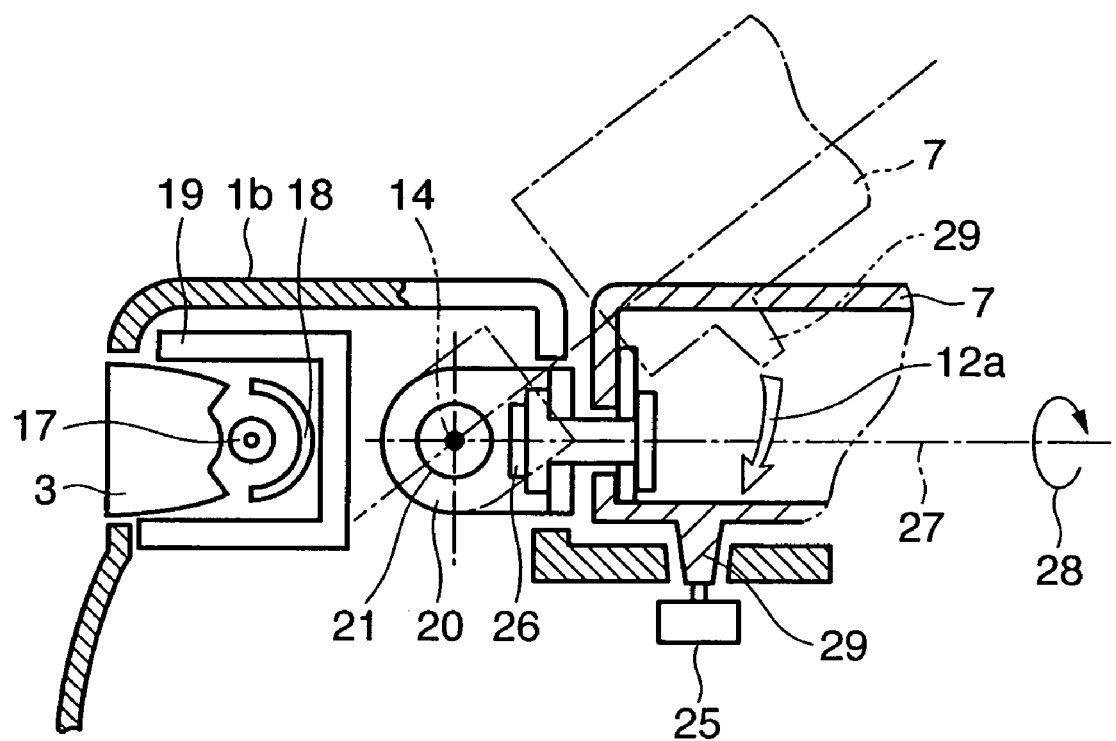
FIG. 3 is a sectional view of the light-emitting section according to the first embodiment of the present invention.

FIG. 3 is a sectional view taken along line AA' of FIG. 2. The case 7 of the image display device is adapted so as to be rotatable about a rotary shaft 14, and the center of rotation of the rotary shaft members 21, 22 coincides with the rotary shaft 14. By virtue of this arrangement, the case 7 of the image display device is free to rotate in the direction of arrow 12 about the rotary shaft 14.

When the case 7 of the image display device has been rotated in the direction of arrow 12a, a detection switch 25 secured within the main body 1 detects a projection 29 provided on the case 7. Conversely, if the case 7 of the image display device is rotated in the direction opposite that of arrow 12a, the projection 29 departs from the detection switch 25 and is no longer sensed thereby. Thus, it is possible to detect whether the case 7 is in the opened or closed state.

Figure 4:
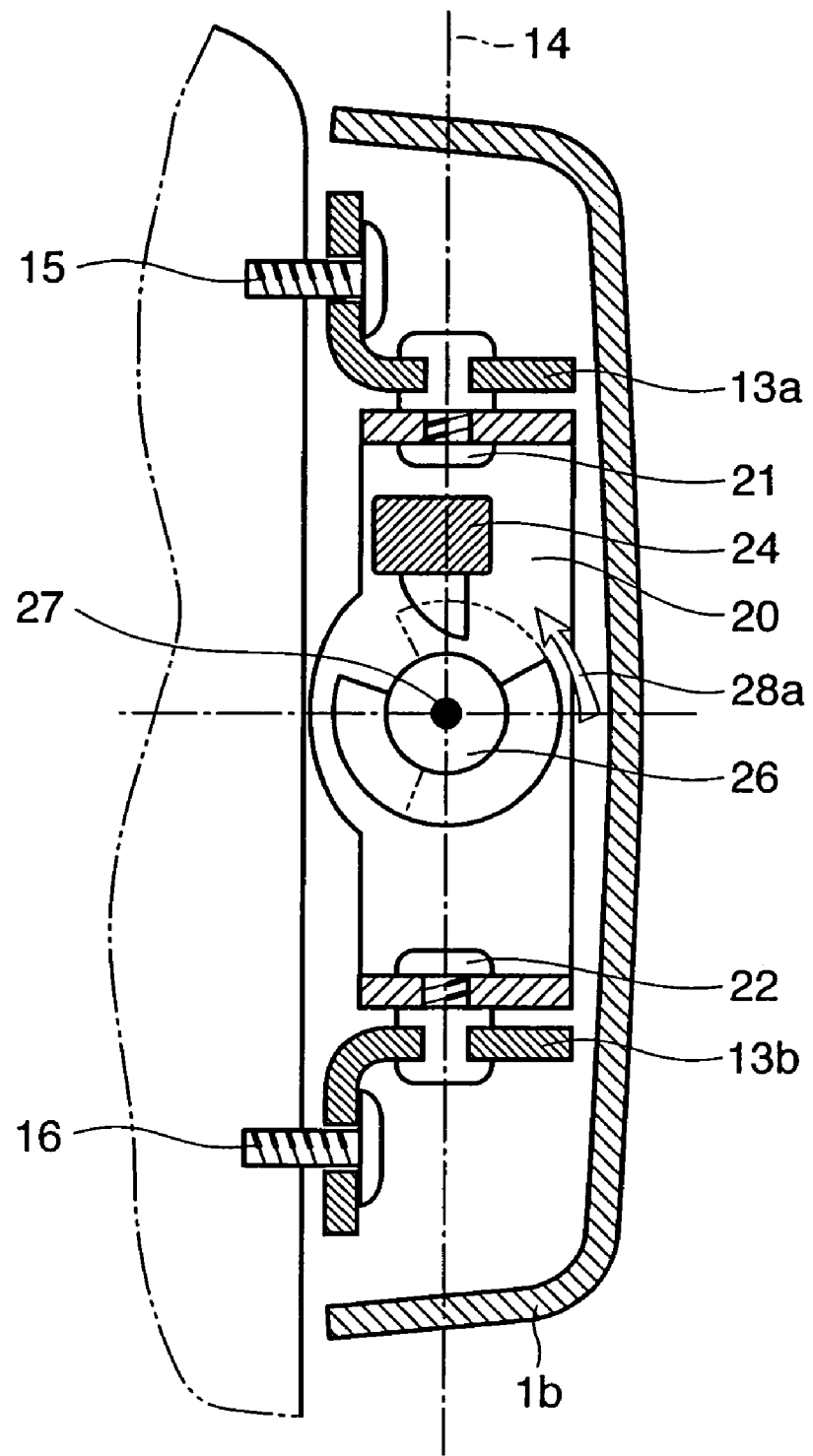
FIG. 4 is a sectional view of the light-emitting section according to the first embodiment of the present invention.

FIG. 4 is a sectional view taken along line BB' of FIG. 2. It is also possible to so arrange it that the case 7 of the image display device is free to rotate in the direction of arrow 28 about a rotary shaft 27 that perpendicularly intersects the rotary shaft 14. At this time the rotating member 20 and case 7 are coupled by a rotary shaft member 26. The central axis of rotation of the rotating member 20 coincides with the rotary shaft 27. In general, this rotation is used when the case 7 of the image display device is in the opened state with respect to the main body 1 of the image sensing apparatus.

In particular, when the case 7 has been rotated in the direction of arrow 28a, a detection switch 24 secured to the hinge detects a projection provided on the rotary shaft member 26. Conversely, when the case 7 is rotated in the direction opposite that of arrow 28a, the projection departs from the detection switch 24 and is no longer sensed thereby. Thus, it is possible to detect through which angle the case 7 of the image display device has been rotated.

Figure 6:
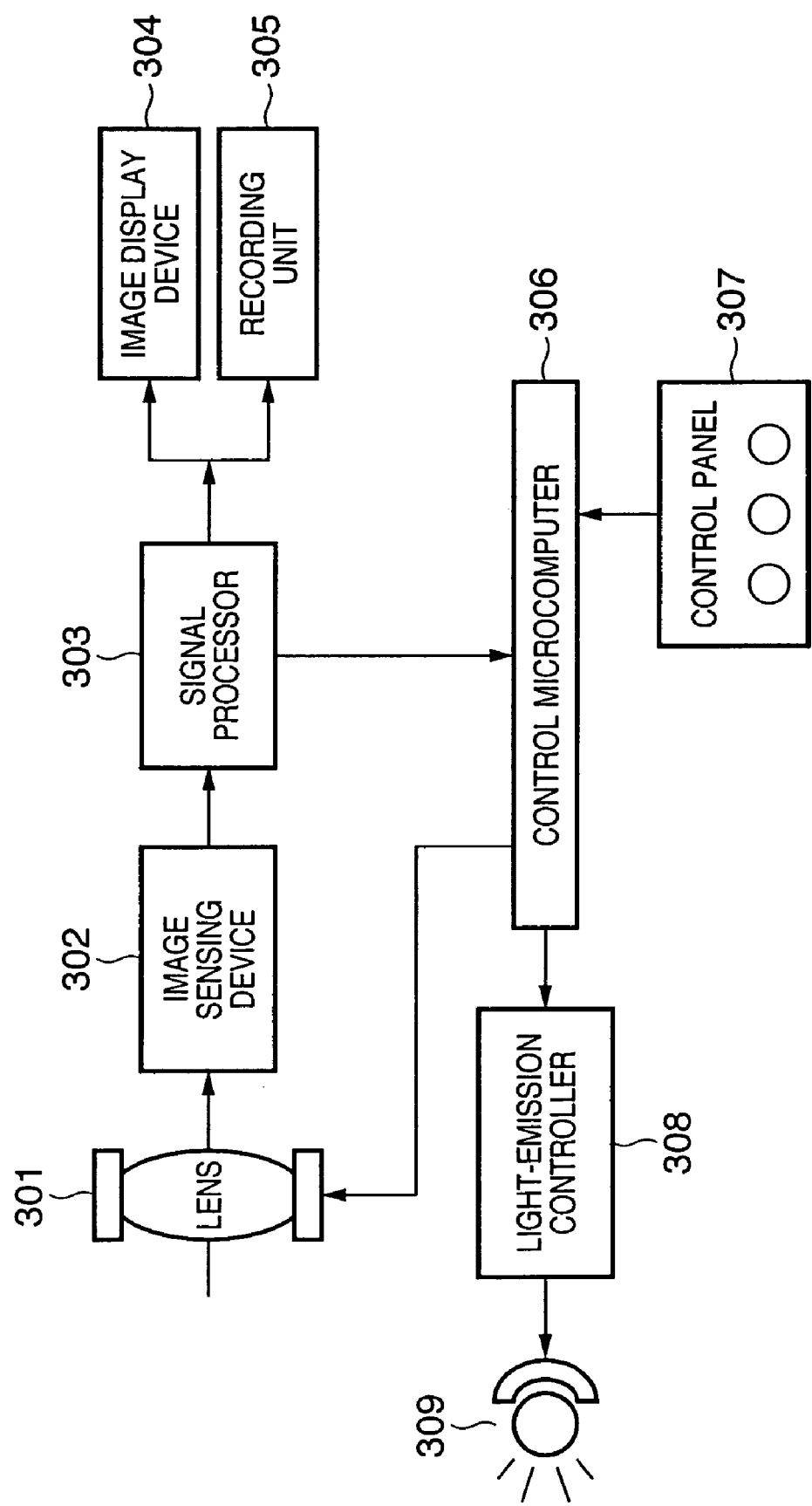
FIG. 6 is a functional block diagram of the image sensing apparatus according to the first embodiment of the present invention.

FIG. 6 is a block diagram illustrating the functional implementation of the image sensing apparatus. Shown in FIG. 6 are an imaging lens 301, an image sensing device 302, a signal processor 303, an image display device 304, a recording unit 305, a microcomputer 306 for control, a control panel 307, a light-emission controller 308 and a light-emitting section 309.

The image of the subject is formed on the photoreceptor surface of the image sensing device 302 via the imaging lens 301. The image sensing device 302 outputs an electric signal conforming to the image of the subject and applies the electric signal to the signal processor 303.

The signal processor 303 converts the electric signal to an image signal of a prescribed format and inputs the image signal to the microcomputer 306, image display device 304 and recording unit 305. The recording unit 305 records the entered image signal on a storage medium such as a removable memory card. Further, the image signal is displayed on the image display device 304 as a visible image.

The user operates the control panel 307 while checking the captured image on the image display device 304. Data representing operations performed using the control panel 307 is converted by the control microcomputer 306 to a command indicating the specific processed content, after which the command is supplied to various components of the apparatus.

In case of a setting where the light-emitting section 309 emits light automatically, the control microcomputer 306 determines the level of illumination of the image of the subject. If the illumination is inappropriate, the control microcomputer 306 issues a light-emission command to the light-emission controller 308, which responds by issuing a light-emission command to the light-emitting section 309.

Further, in case of a setting where the light-emitting section 309 is caused to emit light manually, the user checks the image on the image display device 304. If the user judges that illumination is insufficient, then the user operates the control panel 307 to produce a light-emission signal. Upon receiving this signal, the control microcomputer 306 sends a light-emission command to the light-emission controller 308, in response to which the light-emission controller 308 issues a light-emission command to the light-emitting section 309.

FIGS. 5A and 5B are front and side views, respectively, of the main body 1 of the image sensing apparatus according to the first embodiment of the present invention.

As shown in FIGS. 1, 2, 3, 4, 5A and 5B, the hinge mechanism (13a, 13b, 15, 16, 20, 21, 22 and 26) of the hinge 4 and the light-emitting section (3, 17, 18, 19) are covered in their entirety by the main body 1 of the image sensing apparatus, and the light-emitting section 3 is placed on the subject-side of the hinge 4. Further, the imaging lens, light-emitting section and hinge are laid out at positions of substantially the same height. As a result, an increase in the height of the main body itself is avoided. In particular, as will be understood from FIG. 2, the light-emitting section is made slender in shape and is situated along the same direction as that of the rotary shaft 14. As a result, space between the imaging lens 2 and hinge 4 that was wasted can be utilized and the main body can be reduced in size. Furthermore, since the light-emitting section 3 is not placed underneath the imaging lens 2 (below the portion grasped by the fingers of the user), the light-emitting section 3 will no longer be covered by the fingers and erroneous operation can be prevented.

<Second Embodiment>

A second embodiment of the present invention will now be described with reference to FIGS. 7A to 10C.

An example in which the present invention is applied to a personal digital assistant will be described in the second embodiment. Shown in FIGS. 7A, 7B are a main body 51 of a personal digital assistant equipped with an image sensing device, an imaging lens 52, a light-emitting section 53, a hinge portion 54, an image display device 56 and a case 57 for holding the image display device 56. The case 57 is attached to the main body 51 of the personal digital assistant by the hinge portion 54 so as to be free to open and close. Further, the personal digital assistant has a speaker 55 for emitting voice, a control panel 58, a microphone 59 and a communications antenna 60. The light-emitting section 53 and the hinge portion 54 are incorporated within a case member 51b which is fixed on a case member 51a that is one surface of the main body 51, and extrudes from the case member 51a.

Figure 8:
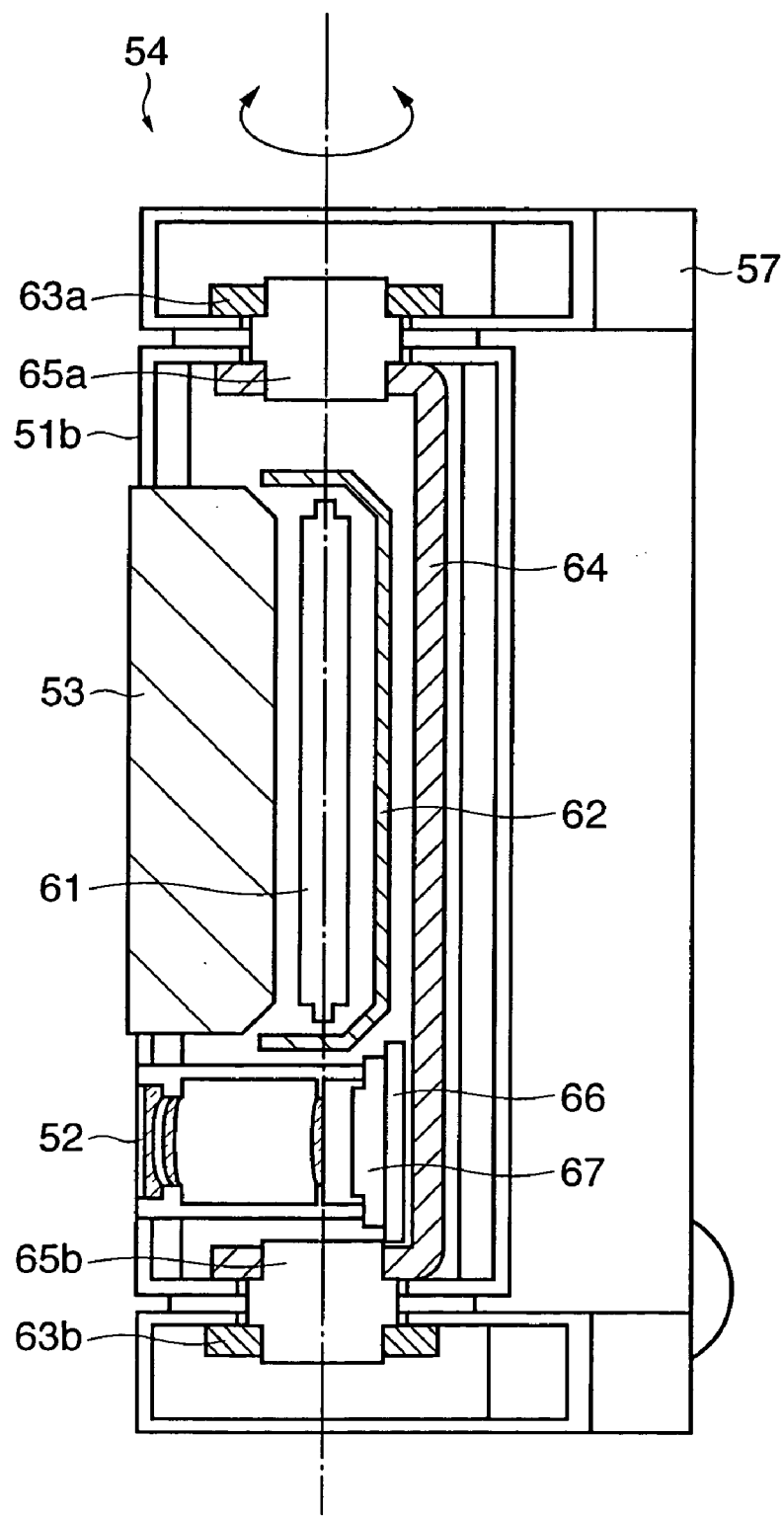
FIG. 8 is a sectional view of a light-emitting section and hinge portion of the image sensing apparatus according to the second embodiment of the present invention.

FIG. 8 is a sectional view illustrating the structure of the hinge portion 54. As shown in FIG. 8, a support member 64 is secured to members 63a, 63b via rotary shafts 65a, 65b, respectively, in the hinge portion 54. The members 63a, 63b are secured to the case 57. Further, the light-emitting section 53, which includes a xenon lamp 61 serving as a light-emitting member and a reflector 62 for reflecting the light from the xenon lamp 61, constitutes a light-guide member for transmitting the light from the reflector 62 to illuminate the subject. Furthermore, the imaging lens 52 is fixed to an electronics board 66, on which an image sensing device (a CCD or CMOS, etc.) 67 has been mounted, in such a manner that the image sensing device 67 is interposed therebetween. The latter is situated at the position of the focal point of the lens group that constructs the imaging lens 52. The structural components of the light-emitting section and the structural components of the imaging lens are disposed within the support member 64.

The user of the personal digital assistant 51 opens the case 57 and operates the control panel 58 while looking at the image display device 56.

When the user employs the personal digital assistant 51 as a telephone, the user holds the speaker to her/her ear and speaks into the microphone 59. In response, voice is converted to an electric signal within the personal digital assistant 51 and is transmitted by radio waves from the external communications antenna 60.

Shooting a picture using the personal digital assistant 51 is performed while pointing the imaging lens 52 toward the subject and checking the video of the subject on the image display device 56. In order to capture the image of the subject brightly at this time, shooting can be carried out while causing the light-emitting section 53 to emit light and illuminate the subject.

Figure 9A:
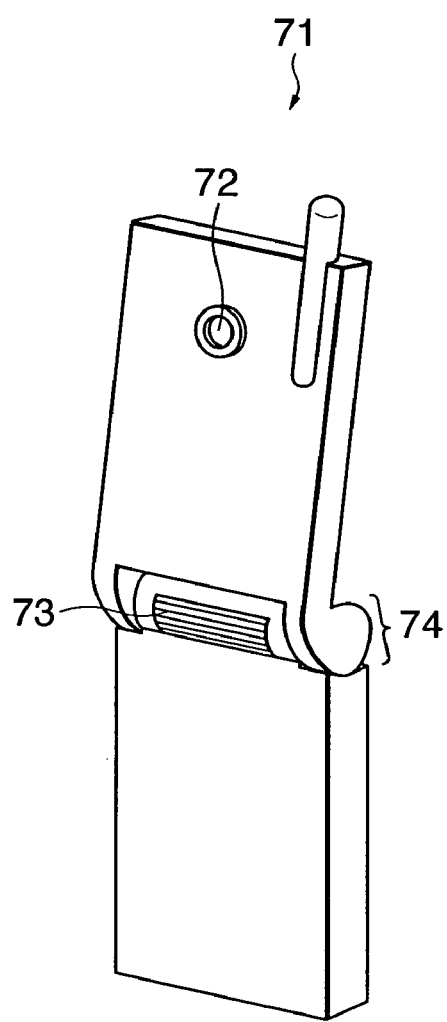
FIG. 9A is a back perspective view illustrating another image sensing apparatus according to the second embodiment of the present invention.
Figure 9B:
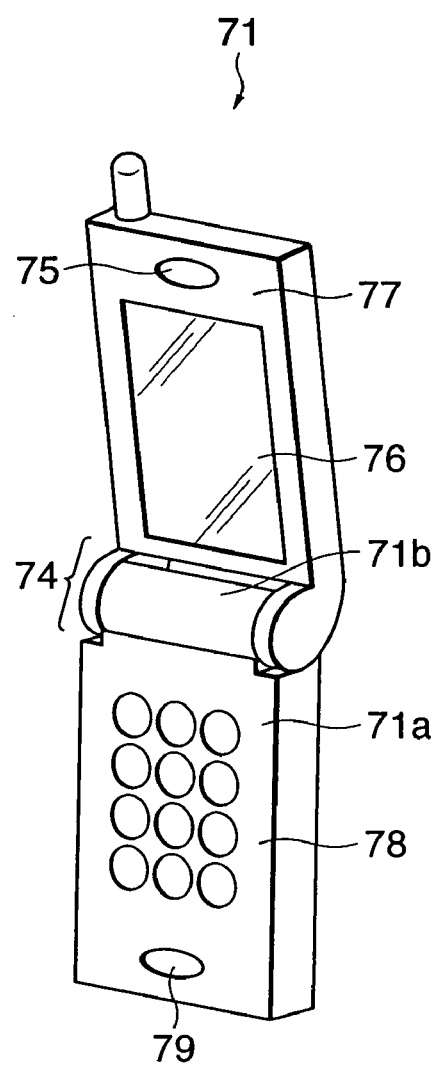
FIG. 9B is a front perspective view illustrating this other image sensing apparatus according to the second embodiment of the present invention.

FIGS. 9A and 9B are diagrams illustrating another example of the structure of the personal digital assistant. This personal digital assistant is of the type in which an imaging lens 72 is mounted on the back side of a case 77 that holds an image sensing device 76. In this case also it is possible to place a light-emitting section 73 inside the structure of a hinge portion 74.

Figure 10A:
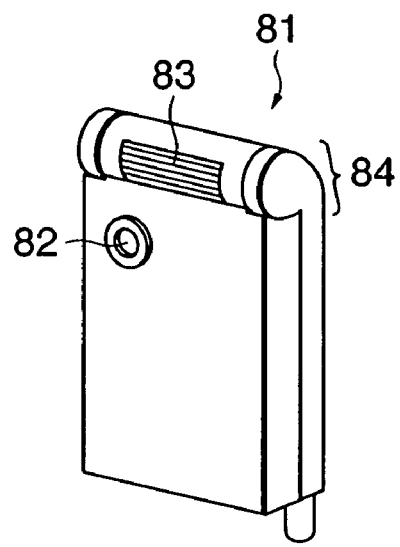
FIG. 10A is a back perspective view illustrating the other image sensing apparatus according to the second embodiment in the folded state.
Figure 10B:
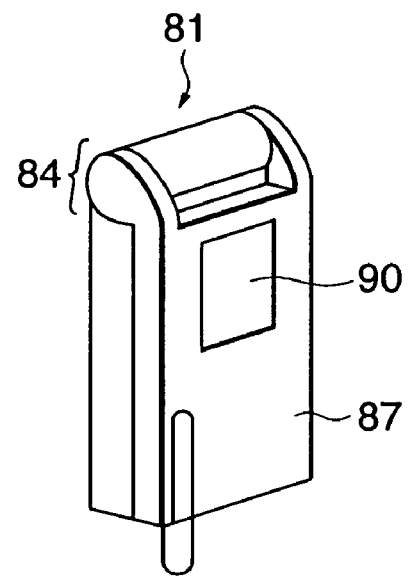
FIG. 10B is a front perspective view illustrating the other image sensing apparatus according to the second embodiment in the folded state.
Figure 10C:
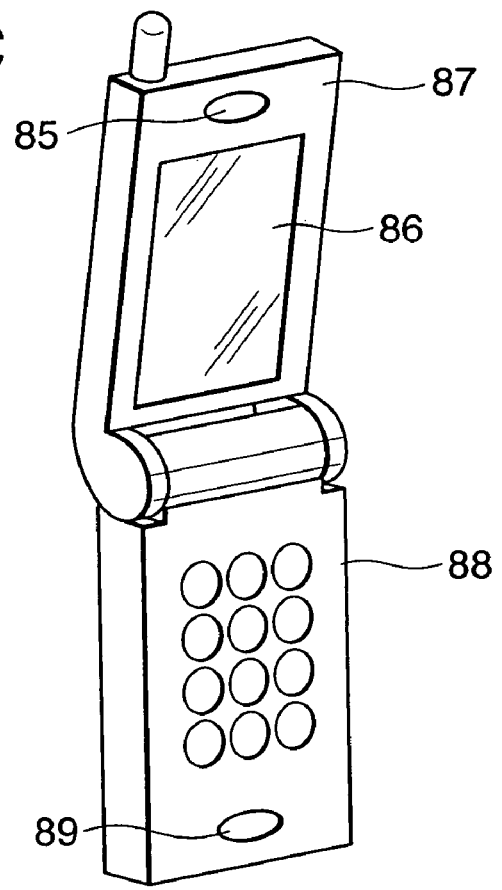
FIG. 10C is a front perspective view illustrating the other image sensing apparatus according to the second embodiment of the present invention.
Figure 11:
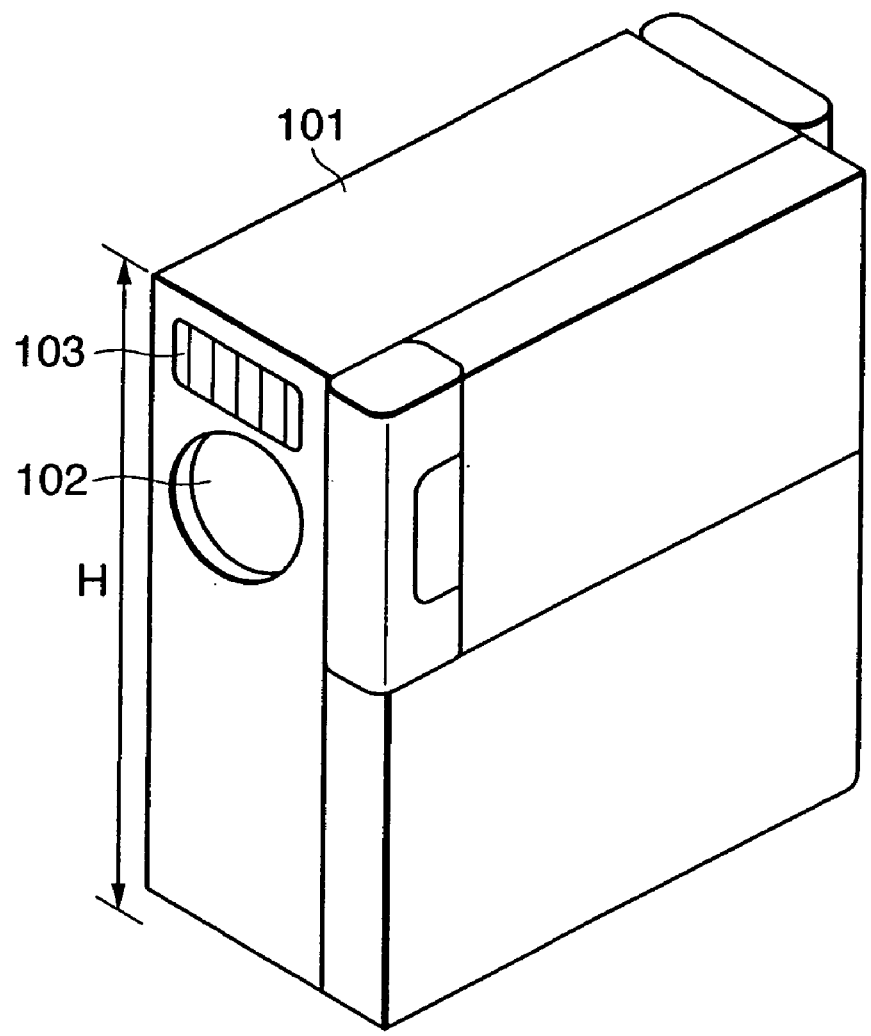
FIG. 11 is a diagram illustrating a first example of the prior art.
Figure 12:
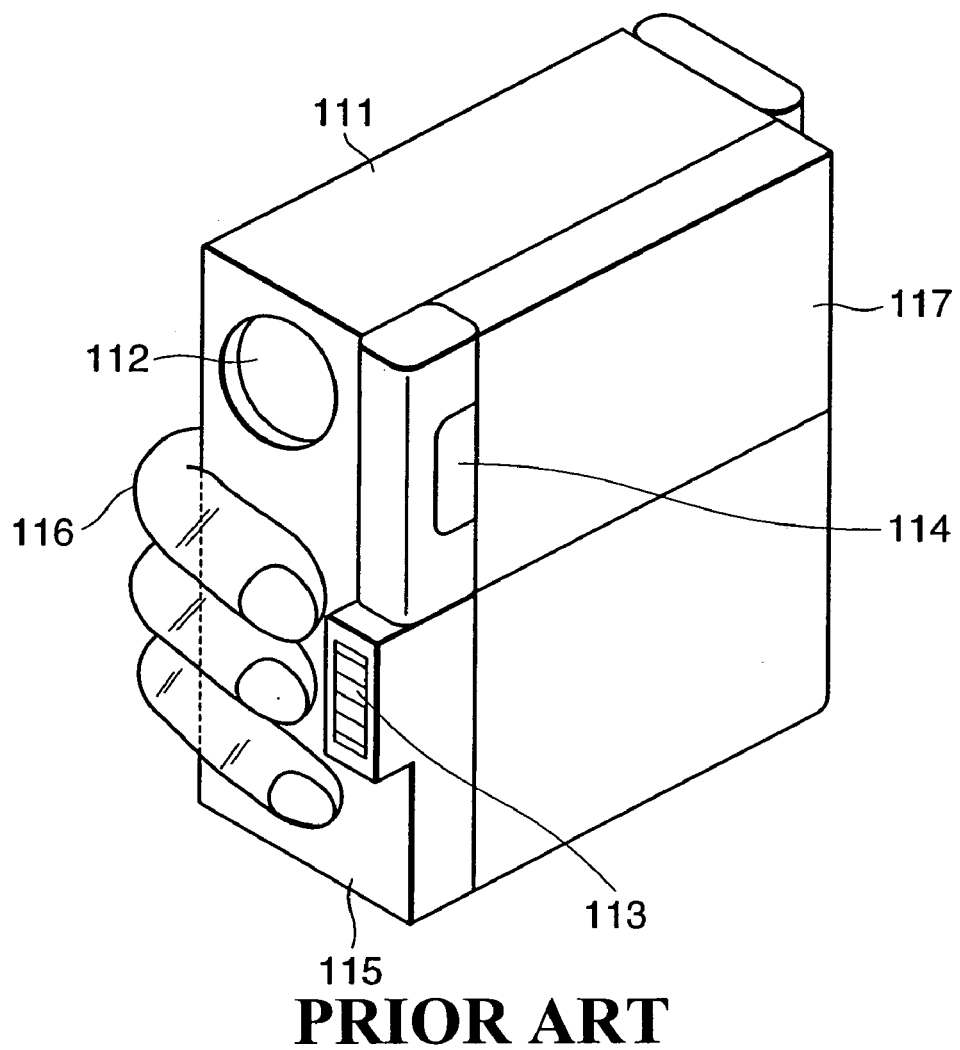
FIG. 12 is a diagram illustrating a second example of the prior art.
Figure 13:
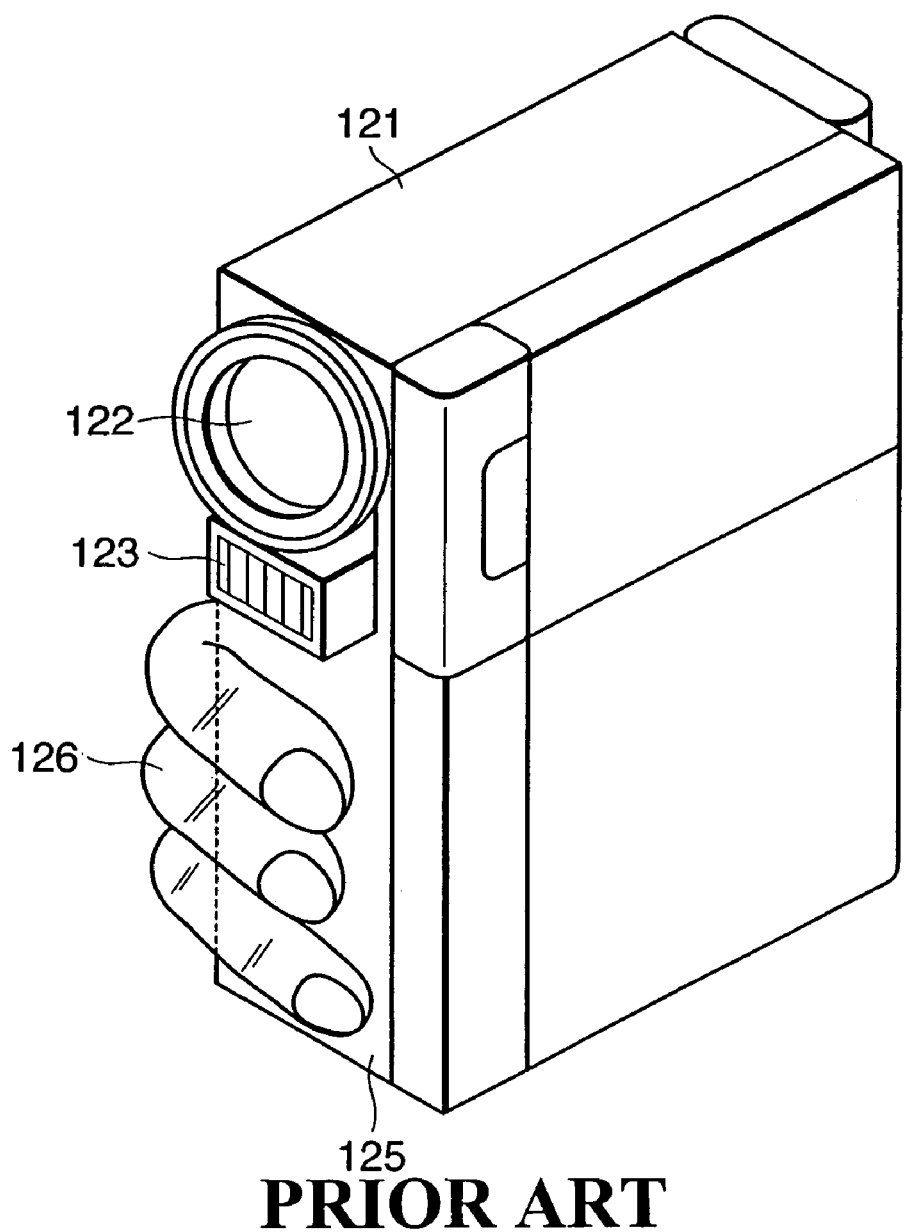
FIG. 13 is a diagram illustrating a third example of the prior art.
Figure 14:
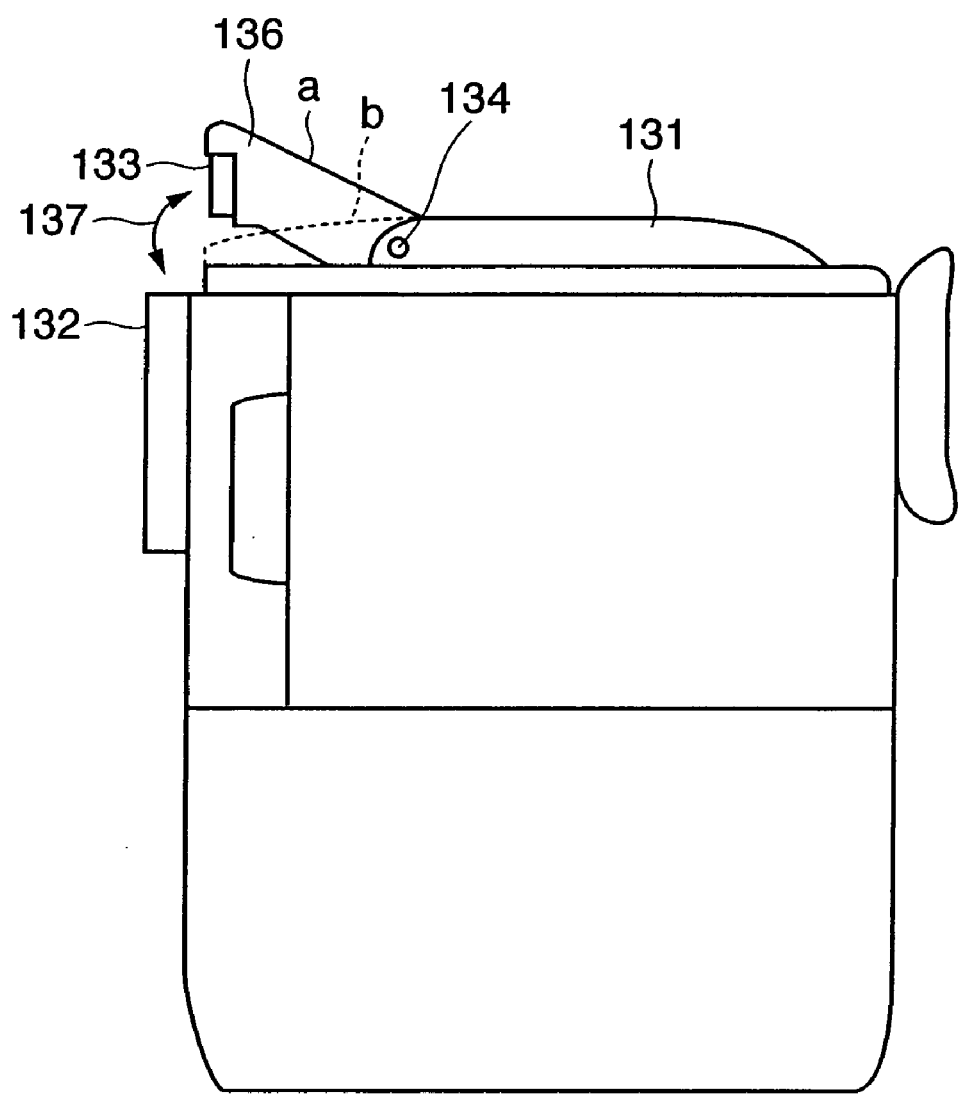
FIG. 14 is a diagram illustrating a fourth example of the prior art.
Figure 15:
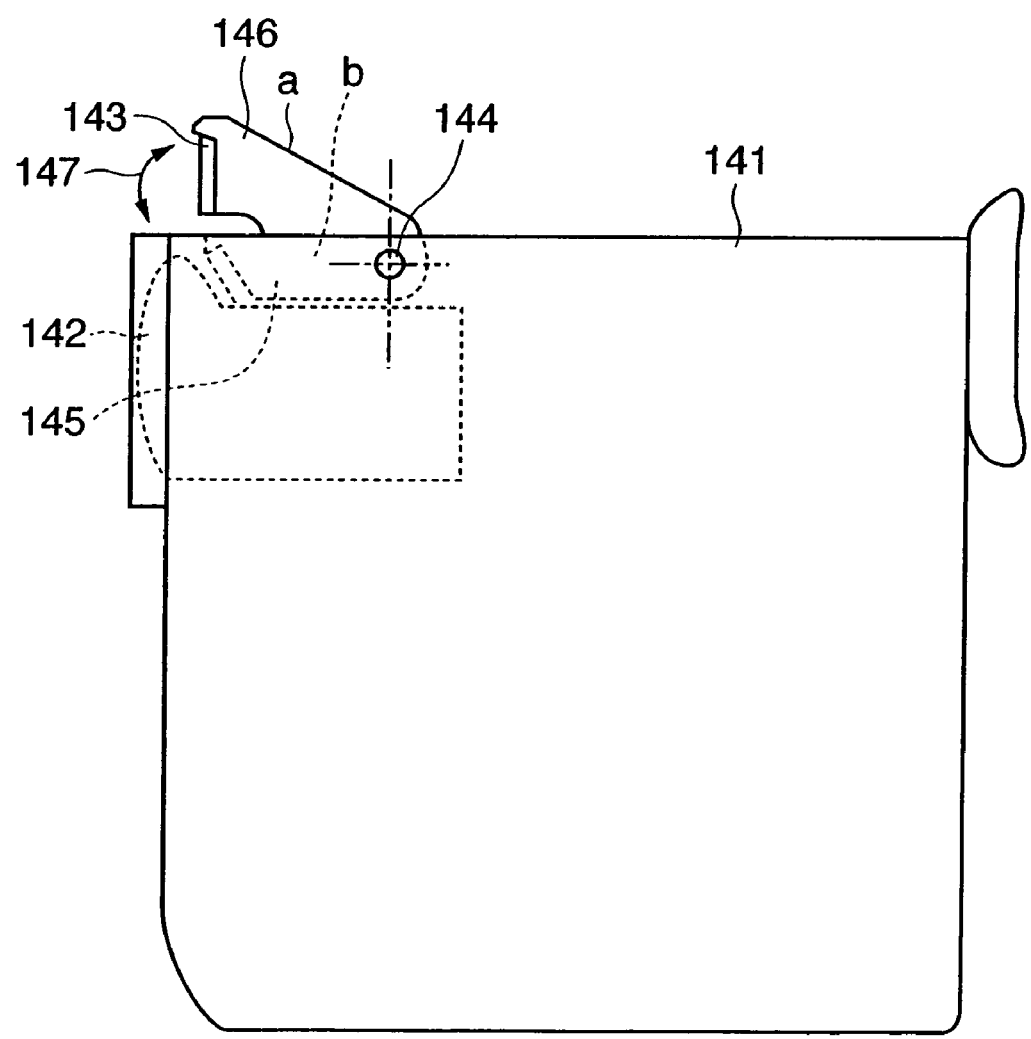
FIG. 15 is a diagram illustrating a fifth example of the prior art.

FIGS. 10A to 10C are diagrams illustrating another example of the personal digital assistant. Shown in FIGS. 10A to 10C are a main body 81 of a personal digital assistant equipped with an image sensing device, an imaging lens 82, a light-emitting section 83 and a case 87 for holding an image display device 86 and a second image display device 90. The case 87 is attached to the main body 81 of the personal digital assistant by the hinge portion 84 so as to be free to open and close. Further, the personal digital assistant has a speaker 85 for emitting voice, a control panel 88 and a microphone 89.

In the case of the arrangement shown in FIGS. 10A to 10C, the user can shoot a picture even without opening the case 87. The user can shoot a picture while pointing the imaging lens 82 toward the subject and checking the video of the subject on the second image display device 90 in two states, namely a state in which the case 87 is closed, as shown in FIGS. 10A, 10B, and a state in which the case is open, as shown in FIG. 10C. In order to capture the image of the subject brightly at this time, shooting can be carried out while causing the light-emitting section 83 to emit light and illuminate the subject.

Thus, an arrangement that includes a light-emitting section can be accommodated within the structure of a hinge portion. This makes it possible to reduce the size of the apparatus.

The first and second embodiments illustrate a case where a section that includes a hinge portion and a light-emitting unit is secured on the side of the main body of an image sensing device. However, it goes without saying that the invention is also applicable to a case where the section including the hinge portion and the light-emitting unit is secured on the side of the display device. More specifically, the light-emitting unit and the hinge portion may be secured within the section which is fixed to and extrudes from one surface of the cases 7, 57, 77 and 87 (a surface surrounding an outer frame of an image display device).

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:
   a main body of the image sensing apparatus having an image sensing unit for sensing an image of a subject;
   a light-emitting device having a long light-emitting surface for emitting light toward the subject;
   an image display unit having an image display screen for displaying an image captured by said image sensing unit; and
   a rotating member enabling said image display unit to rotate with respect to said main body,
   wherein said main body has a long projecting portion to accommodate said light-emitting device and said rotating member, and said light-emitting device is placed in front of said rotating member with said long projecting portion when viewed from the subject.

2. The apparatus according to claim 1, further comprising a second light-emitting device, which is accommodated within said projecting portion, for emitting light toward the subject,
   wherein said second light-emitting device being a video light.

3. The apparatus according to claim 1, wherein said rotating member is a hinge mechanism, said hinge mechanism being a two-axis rotating mechanism.

4. The apparatus according to claim 1, wherein height of said projecting portion from said main body and thickness of said image display unit are substantially equal.

5. The apparatus according to claim 1, wherein said projecting portion internally accommodates an open/close detecting switch for detecting open/closed state of said image display unit and performing ON/OFF control of a display presented on said image display unit.

6. An image sensing apparatus comprising:
   a main body of the image sensing apparatus having a lens unit provided on a front surface of said main body, and an image sensing unit for sensing an image of a subject via said lens unit;
   a light-emitting device for emitting light toward the subject;
   an image display unti having an image display screen for displaying an image capture by said image sensing unit; and
   a rotating member enabling said image display unit to rotate with respect to said main body,
   wherein said main body has a long projecting portion to accommodate said light-emitting device and said rotating member, and, when said image display unit is on a plane which is parallel to the front surface of said main body, said lens unit, said light-emitting unit, and said image display screen are linearly arranged in this order.

7. The apparatus according to claim 6, wherein said light-emitting device has a long light-emitting surface, and said light-emitting device is placed in front of said rotating member within said long projecting portion when viewed from the subject.

8. The apparatus according to claim 6, further comprising a second light-emitting device, which is accommodated within said projecting portion, for emitting light toward the subject,
   wherein said second light-emitting device being a video light.

9. The apparatus according to claim 6, wherein said rotating member is a hinge mechanism, said hinge mechanism being a two-axis rotating mechanism.

10. The apparatus according to claim 6, wherein said projecting portion internally accommodates an open/close detecting switch for detecting open/closed state of said image display unit and performing ON/OFF control of a display presented on said image display unit.

* * * * *

UNITED STATES PATENT AND TRADEMARK OFFICE
CERTIFICATE OF CORRECTION

PATENT NO. : 7,092,626 B2  Page 1 of 1
APPLICATION NO. : 10/891634
DATED : August 15, 2006
INVENTOR(S) : Yoshiyuki Hirai It is certified that error appears in the above-identified patent and that said Letters Patent is hereby corrected as shown below:

Title Page, in item (56), "6,865,406 B1" should be changed to --6,865,406 B2--;

Title Page, in item (56), "6,925,254 B1" should be changed to --6,925,254 B2--;

Column 8, claim 6, line 22, "unti" should be changed to --unit--; and

Column 8, claim 6, line 23, "capture" should be changed to --captured--.

Signed and Sealed this

First Day of May, 2007

JON W. DUDAS
*Director of the United States Patent and Trademark Office*